(12) United States Patent
Chow et al.

(10) Patent No.: US 7,454,523 B2
(45) Date of Patent: Nov. 18, 2008

(54) GEOGRAPHIC LOCATION DETERMINATION INCLUDING INSPECTION OF NETWORK ADDRESS

(75) Inventors: Kingsum Chow, Hillsboro, OR (US);
Sumeet Dua, Baton Rouge, LA (US);
Brian C. Tjaden, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 993 days.

(21) Appl. No.: 09/811,129

(22) Filed: Mar. 16, 2001

(65) Prior Publication Data

US 2002/0143991 A1 Oct. 3, 2002

(51) Int. Cl.
G06F 15/16 (2006.01)
G06F 15/173 (2006.01)

(52) U.S. Cl. ...................................... 709/245; 709/238
(58) Field of Classification Search ................. 709/224, 709/218, 238, 245; 370/351
See application file for complete search history.

(56) References Cited

U.S. PATENT DOCUMENTS

| | | | |
|---|---|---|---|
| 5,948,061 A * | 9/1999 | Merriman et al. ........... 709/219 |
| 6,148,289 A * | 11/2000 | Virdy ............................. 705/1 |
| 6,151,631 A * | 11/2000 | Ansell et al. ................. 709/229 |
| 6,185,541 B1 * | 2/2001 | Scroggie et al. .............. 705/14 |
| 6,185,598 B1 * | 2/2001 | Farber et al. ................. 709/200 |
| 6,223,209 B1 * | 4/2001 | Watson ........................ 709/201 |
| 6,244,758 B1 * | 6/2001 | Solymar et al. .............. 709/224 |
| 6,269,392 B1 * | 7/2001 | Cotichini et al. ............ 709/200 |
| 6,324,538 B1 * | 11/2001 | Wesinger et al. .............. 707/10 |
| 6,665,715 B1 * | 12/2003 | Houri .......................... 709/223 |
| 6,684,250 B2 * | 1/2004 | Anderson et al. ........... 709/225 |
| 6,691,105 B1 * | 2/2004 | Virdy ............................. 707/3 |
| 6,757,740 B1 * | 6/2004 | Parekh et al. ................ 709/245 |
| 6,778,524 B1 * | 8/2004 | Augart ......................... 370/351 |
| 6,826,617 B1 * | 11/2004 | Ansell et al. ................. 709/229 |
| 7,039,689 B2 * | 5/2006 | Martija et al. ............... 709/220 |
| 7,072,963 B2 * | 7/2006 | Anderson et al. ........... 709/225 |
| 7,200,673 B1 * | 4/2007 | Augart ......................... 709/238 |

(Continued)

FOREIGN PATENT DOCUMENTS

WO    WO 2001/42943    *    6/2001

OTHER PUBLICATIONS

Press, Larry, "Tracking the Global Diffusion of the Internet", Nov. 1997, Communications of the ACM, vol. 40, Issue 11, pp. 11-17.*

(Continued)

*Primary Examiner*—Douglas B Blair
(74) *Attorney, Agent, or Firm*—Joni D. Stutman-Horn

(57) ABSTRACT

Geographic location determination for a client is facilitated by performing a trace route between a known network device and the client. The trace route results in a list of intermediary network devices between the client and the known network device. Network addresses may be configured with geographically significant portions. Thus, network addresses for the client and/or one or more of the intermediary devices can be inspected to facilitated a geographic location determination for the client based on the geographically significant portions. An online service provider hosting network sites may prepare client activity reports for the hosted sites using the determined geographic data. The determined geographic locations may also be used to ensure compliance, such as with regulations, distribution agreements, etc., for data distributions to clients.

45 Claims, 4 Drawing Sheets

U.S. PATENT DOCUMENTS

2002/0072965 A1* 6/2002 Merriman et al. .............. 705/14
2002/0087666 A1* 7/2002 Huffman et al. ............ 709/220
2002/0169857 A1* 11/2002 Martija et al. ............... 709/220
2004/0078490 A1* 4/2004 Anderson et al. ........... 709/245

OTHER PUBLICATIONS

Malkin, G., "Traceroute Using an IP Option", IETF RFC 1939, Jan. 1993.*
US 7,349,989, 03/2008, Parekh et al. (withdrawn)*

* cited by examiner

GEOGRAPHIC LOCATION DETERMINATION INCLUDING INSPECTION OF NETWORK ADDRESS

FIELD OF THE INVENTION

The invention generally relates to geographic location determination, and more particularly to inspecting a network address to identify a geographic location.

BACKGROUND

It is advantageous for a server to determine the geographic location of incoming client connections. For example, location determination facilitates media distribution compliance, such as for honoring sporting event black out requirements. Location determination also facilitates providing geographic sensitive advertising, sales offers, discounts, data stream sources, and the like, as well as client tracking and evaluation.

Typically, a web site identifies an incoming client Transmission Control Protocol/Internet Protocol (TCP/IP) address (hereafter IP address), and performs a reverse Domain Name Service (DNS) lookup to obtain a text name for the IP address. This text name can then be inspected to guess a geographic location. For example, a specific IP address may resolve to "cs.sfu.ca", from which can be deduced that the client is connecting from the Simon Frazier University in Canada. However, a problem with this technique is that many domain names cannot reliably be looked up. For example, popular ".to" and ".tv" domains indicate, from a reverse DNS lookup, that clients are respectively geographically located in Tonga and Tuvalu, notwithstanding their actually being based in the United States or another country.

Another technique is to inspect the "whois" domain name registry database to obtain registration details for a domain name. However, there the information within the database is arbitrary, and therefore it also cannot be relied upon. Thus, what is needed is a more reliable way to perform geographic location determination.

BRIEF DESCRIPTION OF THE DRAWINGS

The features and advantages of the present invention will become apparent from the following detailed description of the present invention in which.

DETAILED DESCRIPTION

As will be discussed below, many network addresses are named assigned a text based "human readable" address that is constructed with respect to known geographic locations, e.g., airports, cities, states, corporations, schools, etc. By inspecting geographic references in text based addresses assigned to routers and/or hosts situated between a client and server on a network, a server may improve estimates of a geographic location for a client.

Figure 1:
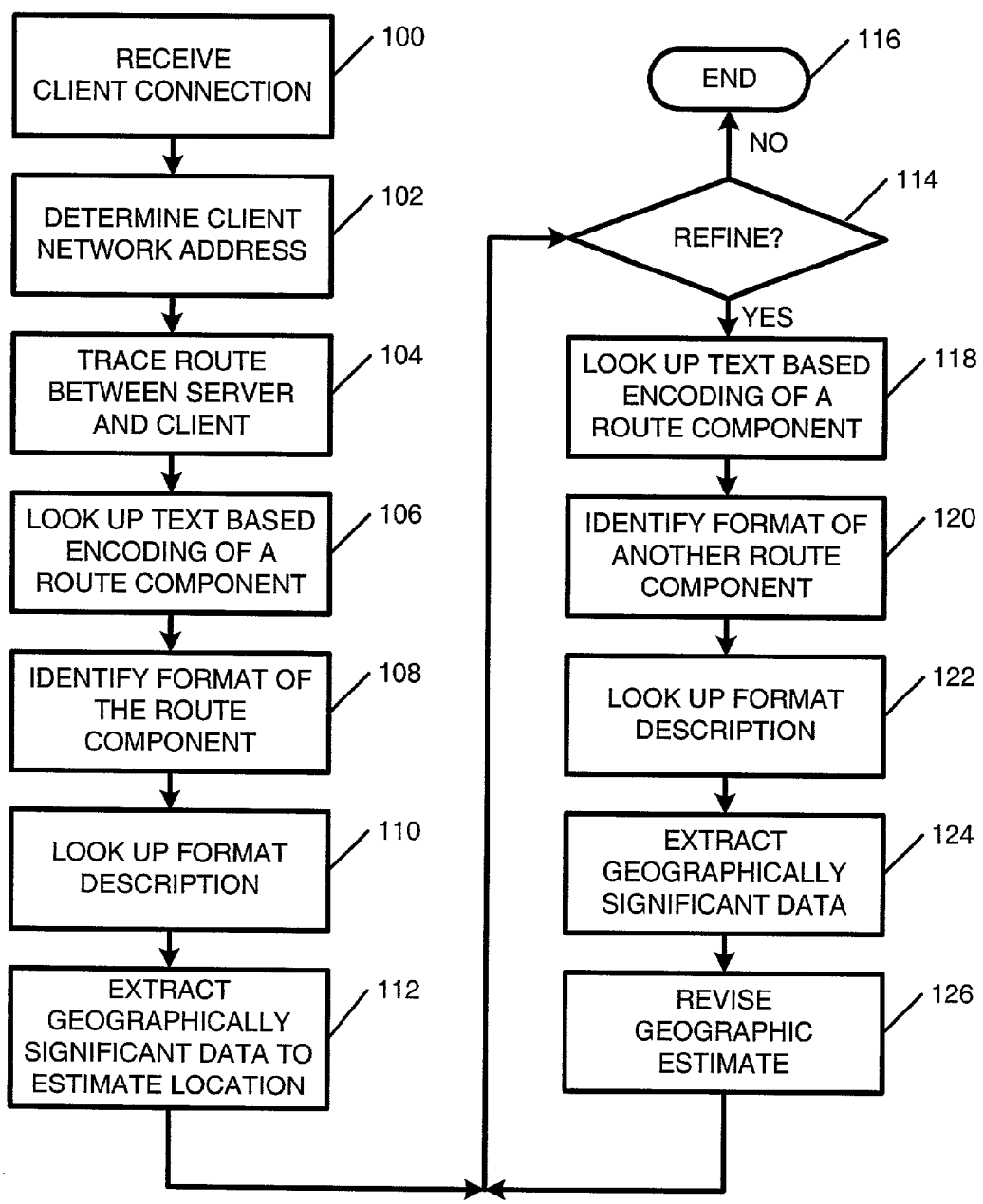
FIG. 1 illustrates one embodiment for determining geographic locations for a client that connects to a server.
Figure 3:
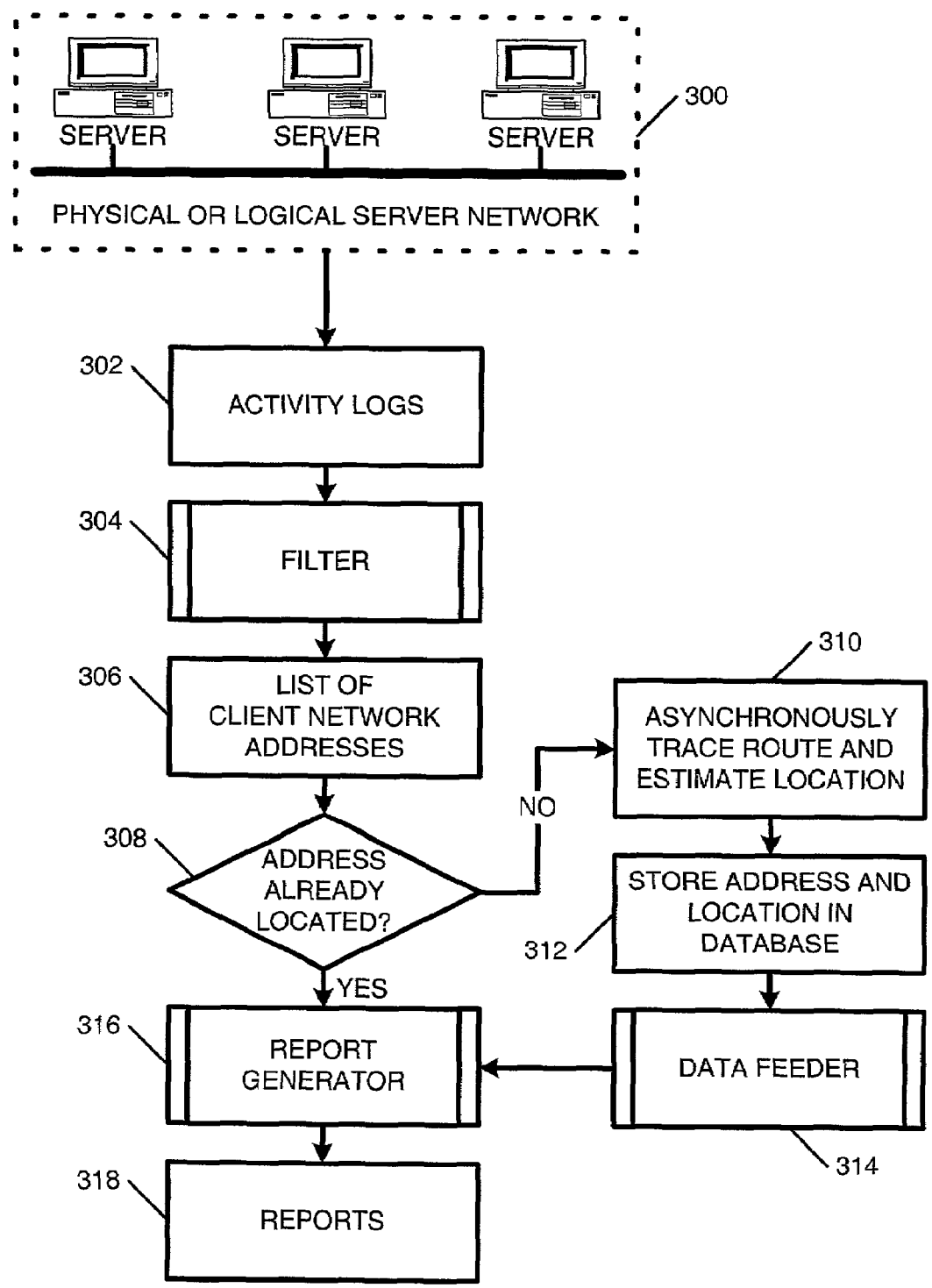
FIG. 3 illustrates one embodiment for reporting estimated client geographic locations.

FIG. 1 illustrates one embodiment for determining a geographic location for a client that connects to a server. In the illustrated embodiment, multiple servers are configured to appear to the client as a single server 300 (FIG. 3).

A first operation is to receive 100 a client connection. Assumed an incoming client connection represents a connection by an individual computer, such as an end-user's computer. It will be appreciated, however, that the incoming connection may be from any networked device, e.g., mobile or non-mobile computers, phones, personal digital assistants (PDAs), etc.

The network address for the connecting client is then determined 102. A network address represents a network identifier at which the incoming client may be reached. It is assumed that the client has a conventional numeric TCP/IP address, e.g., a dot quad address such as 192.168.10.100, or a text based network address. However, it will be appreciated that other network protocols may use a different addressing format.

A trace route is then performed 104 between the server and the client's network address. Trace routing involves determining a network path between the client and server. Examples of extant trace route programs include the "traceroute" application program provided by many Unix operating systems, and the "tracert.exe" application program provided by some Microsoft Windows operating systems. (Please note that all marks used herein are the property of their respective owners.)

In a TCP/IP network, trace routing is effected by directing towards the client successive network data packets with incrementally longer time-to-live (TTL) values. The TTL determines how many hops a packet is allowed before it is returned by a receiving host; return identifies the receiving host. Through successive TTL increments, all intermediary hosts (e.g., computers, routers, machines, other network devices, etc.) between the client and the server can be identified. It will be appreciated that other network environments may provide equivalent techniques.

In one embodiment, the trace routing is performed entirely externally to the client, e.g., the route path is always directed towards the client. In another embodiment, a trace route is performed from the client to the server. In a further embodiment, both the client-side and server-side trace routes are combined to maximize ability to determine a geographic location for the client. In one embodiment, the client-side trace route is performed by a network browser "plug in" or "helper application." In one embodiment, client side trace routing may be triggered automatically, such as by the client receiving and executing a server-side or client-side script, a web page, or other trigger.

Assuming trace routing may provide a results list comprising both text based and numeric network addresses, the numeric network address are looked up 106 to determine their text based encoding. In one embodiment having a TCP/IP network, looking up network addresses comprises performing a reverse DNS lookup on the numeric network address. In one embodiment, rather than looking up all numeric addresses in the list, instead less than all are looked up. For example, one might only look up a few of the network addresses in the list "nearest" the client.

After text based encodings have been looked up, a format for the text based encodings is identified 108. A format describes the arrangement, or structure, of the text assigned to a numeric network address. Frequently, network backbone companies structure the text based network addresses to facilitate organization, management and security of the network addresses. In particular, the structure often comprises a geographic component so that the network backbone can distinguish addresses assigned to different regions of the country.

Figure 2:
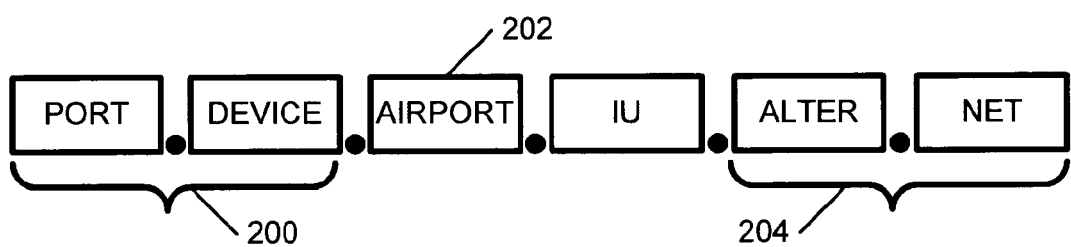
FIG. 2 illustrates an exemplary format for encoding a numeric network address with a text based network addresses.

For example, FIG. 2 illustrates an exemplary format utilized by UUNet (a division of WorldCom, Inc. of Georgia) for encoding a numeric network address with a text based network addresses. As illustrated, the exemplary network address has a first portion 200 comprising port and device data for network equipment utilized to host a particular network address, and a last portion 204 identifying a particular backbone provider (here, alter.net is a part of WorldCom). The middle portion 202 of the illustrated exemplary address comprises a reference to a nearest airport to the device to which the network address is assigned. Thus, one may look up the airport code for a UUNet address and determine the nearest airport for a particular network address.

Continuing with FIG. 1, after identifying 108 the format, a format description is looked up for the identified format. A format description identifies portions of the format, if any, that contain geographically significant data. For example, as illustrated in FIG. 2, the format description would identify the airport code portion 202 as being a geographically significant portion. Note that a text based network address may have multiple geographic references, e.g., multiple airport, city, state, etc. identifiers. The format description identifies portions relevant to determining the geographic location of the network address.

In one embodiment, a database stores known formats and indicators of geographically significant portions of the stored formats. In one embodiment, if an address does not match any stored known formats, or if it appears to match multiple formats, then an expert system, rule based system, or other deductive system may be utilized to analyze a text based network address to determine its geographic location. For example, if a trace route indicates network traffic traveled from X, through Y, to Z, and it is determined X and Z are WorldCom addresses, but it is unclear what format Y has, then a rule may conclude that Y is also a WorldCom address by virtue of its being enclosed by WorldCom addresses. In one embodiment, a scoring system is used to select a most likely format for a particular network address.

Lexical analysis or pattern matching (e.g., regular expressions) may be used to match a text based network address against known formats. In one embodiment, the search space for a matching format is reduced by identifying the domain name of the network address, e.g., FIG. 2. item 204, and then only searching for matches used with that domain name. For example, if alter.net is identified in the last portion of the text based network address, then only formats used by alter.net are inspected for a match.

After looking up 110 the format description, geographically significant portions of the text based network address are extracted 112 and used to estimate a geographic location of the client. In the illustrated embodiment, rather than identifying the format and geographically significant portions of all network addresses resulting from the trace route, instead only a network address "nearest" the client is processed. After extracting 112 the geographically significant portions, a test 114 is performed to determine whether refinement is desired. Such refinement may be required when no reverse DNS lookup can be performed to obtain a text based readable encoding of the "nearest" address, or if one desires to corroborate estimates through inspection of other addresses.

If no refinement is desired, then processing ends 116. If refinement is desired, then as discussed above, a text based encoding for another network address is looked up 118, if necessary, its format identified 120, the format description looked up 122, and geographically significant portions extracted 124. This supplementary geographic location data is then used to revise 126 the initial geographic location estimate. Processing continues with another test 114 for further refinement.

In one embodiment, client geographic location estimation may also be based at least in part on data known about the client, e.g., from data obtained from client records, mailing lists, marketing research, etc. In one embodiment, a database is used to store text based encodings for trace route results that had to be looked up, as well as estimated geographic locations for client network addresses. This database may then operate as a cache for subsequent processing of repeated network addresses.

FIG. 3 illustrates one embodiment for reporting estimated client geographic locations. Estimated locations may be determined as discussed above, or retrieved from a database caching previous determinations.

As illustrated, a client may contact a single server, or multiple servers in a data center 300. In one embodiment, data center servers may be logically grouped to appear as a single server. In one embodiment, the servers 300 host a customer's Internet web site(s). Contact activity, e.g., by customers, visitors, etc., results in the generation of client activity logs 302 containing network addresses associated with contacting entities. As discussed above, a trace route can be performed between the servers 300 and a client to estimate a geographic location for the client. In one embodiment, each client network address is immediately processed to identify a geographic location for the client upon the client contacting the servers 300. In another embodiment, network addresses are collected for later asynchronous processing when a sufficient number of network addresses have been collected.

Assuming that addresses are collected for later group processing, in one embodiment, client activity logs 302 are filtered 304 to remove undesirable network addresses to prevent these network addresses from being processed. Undesirable network addresses include addresses that have been previously processed, as well as recognized addresses, such as ones belonging to machines of the servers 300, or other known/undesirable machines. It will be appreciated that various filter characteristics may be used to determine undesirable addresses.

Filtering results in a list 306 of network addresses for which a geographic location is to be determined. A test 308 is performed to determine whether a particular network address in the list has previously been located. If not, then the network address is asynchronously trace routed 310 to identify, as discussed above, intermediaries between the client and the servers 300. As illustrated, it is assumed the trace route operation also analyzes the route results to estimate a geographic location for the network address as discussed above. The trace routing is performed asynchronously to allow collection of client network addresses for location to continue independent of the trace routing operation. It will be appreciated, however, that some embodiments may perform the trace routing synchronously, such as discussed above, when a client network addresses is processed on contact with the servers 300.

The determined location for the client is then stored 312 in a database, and given to a data feeder 314 which is used to feed the results to a report generator 316. The report generator generates reports 318 of client activity that can be distributed to businesses being hosted by the servers 300. By storing 312 the determined location, in a subsequent geographic location determination, the test 308 returns that the client network address is already known, and the value stored 312 in the database is provided directly to the report generator 316. It will be appreciated that various reports 318 may be generated, such as reports for a particular site hosted by the servers indicating the geographic location for clients contacting the sites. It will be further appreciated that the mechanisms discussed herein may be applied in real time determinations of appropriate advertising, content, etc. to be sent to a contacting client.

Figure 4:
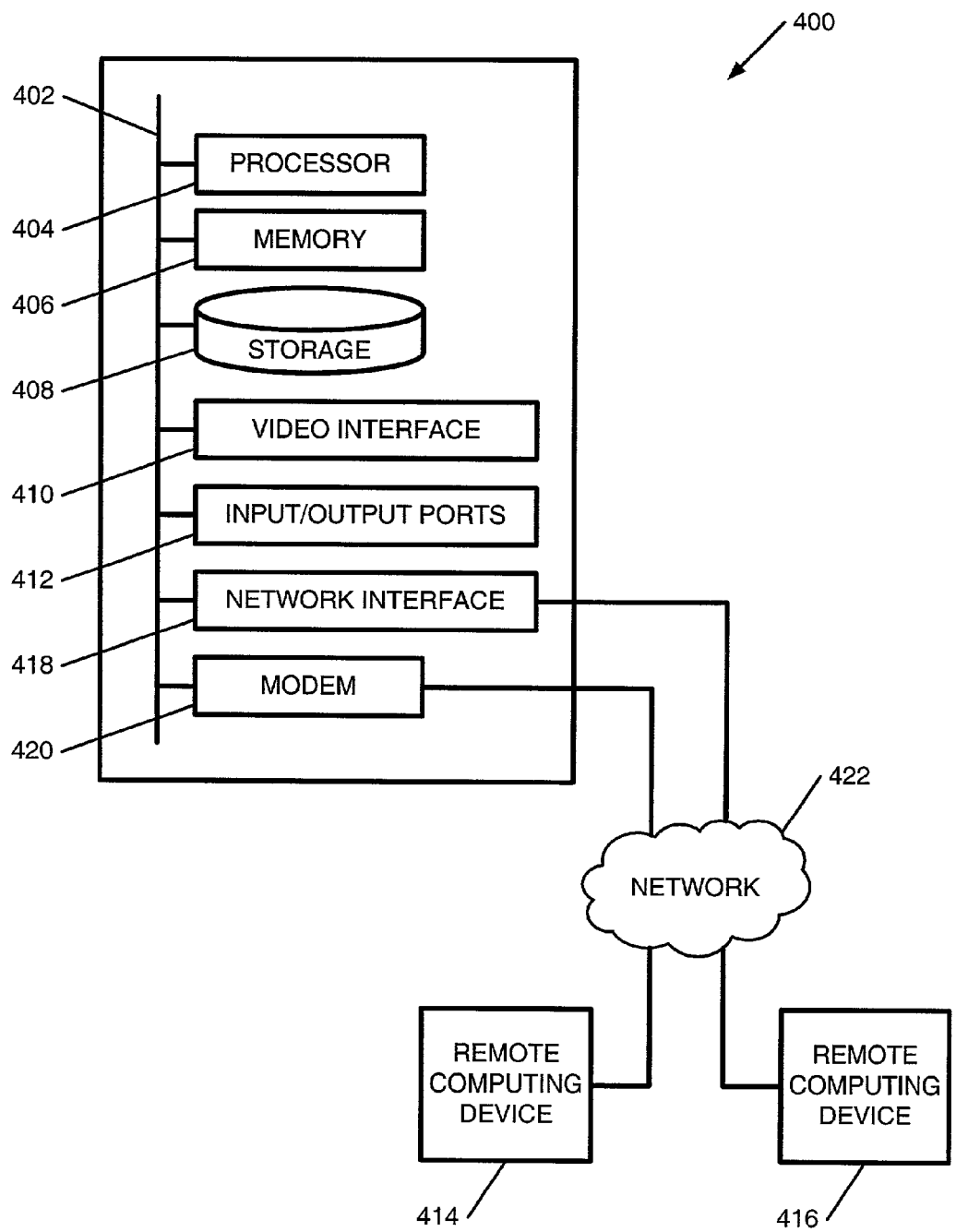
FIG. 4 illustrates a suitable computing environment in which certain aspects of the invention may be implemented.

FIG. 4 and the following discussion are intended to provide a brief, general description of a suitable computing environment in which certain aspects of the illustrated invention may be implemented.

For example, an exemplary system for embodying one of the servers 300 of FIG. 3 includes a machine 400 having system bus 402 for coupling various machine components. Typically, attached to the bus are processors 404, a memory 406 (e.g., RAM, ROM), storage devices 408, a video interface 410, and input/output interface ports 412. The machine may also include embedded controllers, Programmable Logic Devices (PLD), Programmable Logic Arrays (PLA), Programmable Array Logic (PAL), Generic Array Logic (GAL), Field-Programmable Gate Arrays (FPGA), Application Specific Integrated Circuits (ASIC), computers, smart cards, or another machine, system, etc.

The machine is expected to operate in a networked environment using logical connections to one or more remote machines 414, 416 through a network interface 418, modem 420, or other communication pathway. Machines may be interconnected by way of a wired or wireless network 422 including an intranet, the Internet, local area networks, wide area networks, cellular, cable, laser, satellite, microwave, Blue Tooth, optical, infrared, or other carrier technology.

The invention may be described by reference to different high-level program modules and/or low-level hardware contexts that may be stored in memory 406 and/or storage devices 408. Program modules include procedures, functions, programs, components, data structures, and the like, for performing particular tasks or implementing particular abstract data types. One skilled in the art will realize that program modules and low-level hardware contexts can be interchanged with low-level hardware instructions, and are collectively referenced hereafter as "directives." One will further appreciate that directives may be recorded or carried in a compressed, encrypted, or otherwise encoded format without departing from the scope of this patent, even if the instructions must be decrypted, decompressed, compiled, interpreted, or otherwise manipulated prior to their execution or other utilization by the machine.

Memory 406, storage devices 408, and associated media, can store data and directives for the machine 400. Program modules may be implemented within a single machine, or processed in a distributed network environment, and stored in both local and remote memory. Memory and storage devices include hard-drives, floppy-disks, optical storage, magnetic cassettes, tapes, flash memory cards, memory sticks, digital video disks, biological storage, and the like, as well as wired and wireless transmission environments, such as network 422, over which directives may be delivered in the form of packets, serial data, parallel data, or other suitable transmission format.

Thus, for example, with respect to the illustrated embodiments, assuming machine 400 operates a server, then remote devices 414, 416 may respectively be clients contacting the server over the network 422. It will be appreciated that remote machines 414, 416 may be configured like machine 400, and therefore include many or all of the elements discussed for machine. It should also be appreciated that machines 400, 414, 416 may be embodied within a single device, or separate communicatively-coupled components, and may include or be embodied within routers, bridges, peer devices, web servers, etc.

Illustrated methods, and corresponding written descriptions thereof, are intended to illustrate machine-accessible media storing directives, or the like, which may be incorporated into single and multi-processor machines, portable computers, such as handheld devices including Personal Digital Assistants (PDAs), cellular telephones, and the like. Directives, when accessed, read, executed, loaded into, or otherwise utilized by a machine, causes the machine to perform the illustrated methods. The figures, written description, and claims may variously be understood as representing instructions taken alone, instructions as organized in a particular form, e.g., packet, serial, parallel, etc., and/or instructions together with their storage or carrier media.

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless implicitly or expressly indicated otherwise, embodiments are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for geographic location determination based at least in part on inspection of a network address of a client, the method comprising:

performing a trace route between a server and the address of the client, the trace route identifying at least one domain name in a route between the server and the client;

identifying a construction format for the domain name, wherein the construction format comprises a first portion including port and device data for network equipment utilized to host a particular network address, a last portion identifying a particular backbone provider, and a middle portion comprising a reference to a nearest airport to a device to which the particular network address is assigned;

identifying a geographically significant component of the domain name;

determining a geographic location for the domain name based at least in part on the geographically significant component;

determining a possible geographic location of the client based on a geographically significant component of a text based network address corresponding to the client network address; and validating the possible geographic location of the client using the determined geographical location of the domain name identified in the trace route, the validating returning a validated geographic location of the client.

2. The method of claim 1, further comprising:
analyzing domain names associated with a network access provider so as to identify the construction formats for said domain names;
identifying geographically significant components of said construction components; and
storing cross-references between said geographically significant components and geographic locations in a storage.

3. The method of claim 1, wherein the validating further comprises:
performing a first geographic location determination for the network address based on a determined geographical location for the domain name returned in the trace route;
performing at least one alternate geographic determination for the network address based on at least one additional determined geographic location for at least one additional domain name returned from the trace route; and
selecting a validated geographic location of the client from either the first geographic location determination or one of the at least one additional determined geographic location determinations.

4. The method of claim 3, wherein the selecting further comprises:
ranking said determined geographic locations in accordance with the number of alternate geographic location determinations consistent with said determined geographic locations.

5. The method of claim 1, further comprising:
providing a regular expression corresponding to the construction format;
matching the regular expression against the domain name; and
identifying a geographically significant portion of the regular expression so as to facilitate said identifying the geographically significant component of the domain name.

6. The method of claim 1, wherein said performing the trace route is performed from the server to the client.

7. The method of claim 1, wherein said performing the trace route is performed from the client to the server.

8. The method of claim 1, wherein identifying a geographically significant component of the domain name and network address comprises:
performing one of lexical analysis or pattern matching on the domain name and the text based network address to match against known formats; and
selecting a likely geographically significant component using a deductive algorithm to analyze the domain name and text based network address.

9. The method as recited in claim 8, wherein the deductive algorithm comprises one of an expert system or rule based system.

10. A method for determining a geographic location for a network address, comprising:
receiving a trace route comprising first and second network host identifiers for hosts disposed between a server and a client on a network;
matching the first network host identifier to a first template;
first parsing the first network host identifier according to the first template to determine a first geographically significant component, wherein the geographically significant component is derived from a construction format of the network host identifier, the network host identifier comprising a first portion including port and device data for network equipment utilized to host a particular network address, a last portion identifying a particular backbone provider, and a middle portion comprising a reference to a nearest airport to a device to which the particular network address is assigned;
identifying an estimated geographic location for the client based at least in part on said first parsing;
matching the second network host identifier to a second template;
second parsing the second network host identifier according to the second template to determine a second geographically significant component; and
revising said estimated geographic location based at least in part on said second parsing.

11. The method of claim 10, further comprising:
revising said estimated geographic location based at least in part on a client profile associated with the client.

12. The method of claim 11, further comprising:
said client contacting the server with the web browser, said browser providing the client profile to the server.

13. The method of claim 11, wherein the client profile is based at least in part on a customer database identifying the client.

14. The method of claim 11, wherein the client profile is based at least in part on a mass-marketing database identifying the client.

15. A method of determining a geographic location, comprising:
creating a log comprising network addresses of clients that have communicated with a web server;
filtering the log so as to remove undesirable network addresses;
asynchronously performing a trace route between a first one of said filtered network addresses and the server regardless of a whether a previous geographic location for the first one of said filtered network addresses had been determined;
analyzing a result of said asynchronous performed trace route to ascertain a geographically significant component of at least one network address between a first one of said filtered network addresses and the server; wherein the geographically significant component is derived from a construction format of the network address, where the construction format comprises a first portion including port and device data for network equipment utilized to host a particular network address, a last portion identifying a particular backbone provider, and a middle portion comprising a reference to a nearest airport to a device to which the particular network address is assigned; and
determining a geographic location for said first one responsive to said analyzing.

16. The method of claim 15, further comprising:
generating a report comprising geographic locations for clients that have communicated with the web server.

17. The method of claim 15, wherein said determining the geographic location comprises:
matching the result against a template identifying geographically significant portions of network addresses formatted in compliance with the template.

18. The method of claim 15, wherein analyzing a result of said asynchronous performed trace route further comprises:
selecting a first and second network address in the trace route;
performing a reverse address lookup of the first and second network address and the first one of said filtered network addresses, the first one of said filtered network addresses corresponding to a client, the performing to derive a first and second text based network address and client text based network address;

performing one of lexical analysis or pattern matching on the first and second text based network address and the client text based network address to match against known formats; and selecting a likely geographically significant component for each text based network address using a deductive algorithm to analyze the text based addresses; and returning the likely geographically significant components for use in the determining a geographic location for the client.

19. A computer readable storage medium having instructions stored thereon for geographic location determination based at least in part on inspection of a network address of a client, the instructions when executed on a machine, cause the machine to:

perform a trace route between a server and the address of the client, the trace route identifying at least one domain name in a route between the server and the client;

identify a construction format for the domain name, wherein the construction format comprises a first portion including port and device data for network equipment utilized to host a particular network address, a last portion identifying a particular backbone provider, and a middle portion comprising a reference to a nearest airport to a device to which the particular network address is assigned;

identify a geographically significant component of the domain name;

determine a geographic location for the domain name based at least in part on the geographically significant component;

determine a possible geographic location of the client based on a geographically significant component of a text based network address corresponding to the client network address; and validate the possible geographic location of the client using the determined geographical location of the domain name identified in the trace route, the validating returning a validated geographic location of the client.

20. The storage medium of claim 19, said instructions including further instructions capable of directing the processor to perform:

analyzing domain names associated with a network access provider so as to identify the construction formats for said domain names;

identifying geographically significant components of said construction components; and storing cross-references between said geographically significant components and geographic locations in a storage.

21. The storage medium of claim 19, said instructions for validating include further instructions capable of directing the processor to perform:

performing a first geographic location determination for the network address based on a determined geographical location for the domain name returned in the trace route;

performing at least one alternate geographic determination for the network address based on at least one alternate determined geographic location for at least one additional domain name returned from the trace route; and selecting a validated geographic location of the client from either the first geographic location determination or one of the at least one alternate determined geographic location determinations.

22. The storage medium of claim 21, wherein the selecting includes further instructions capable of directing the processor to perform:

ranking said determined geographic locations in accordance with the number of alternate geographic location determinations consistent with said determined geographic locations.

23. The storage medium of claim 19, said instructions including further instructions capable of directing the processor to perform:

providing a regular expression corresponding to the construction format;

matching the regular expression against the domain name; and identifying a geographically significant portion of the regular expression so as to facilitate said identifying the geographically significant component of the domain name.

24. The storage medium of claim 19, wherein said performing the trace route is performed from the server to the client.

25. The storage medium of claim 19, wherein said performing the trace route is performed from the client to the server.

26. The apparatus of claim 19, wherein identifying a geographically significant component of the domain name and network address comprises:

determination component for performing one of lexical analysis or pattern matching on the domain name and the text based network address to match against known formats; and selection component for selecting a likely geographically significant component using a deductive algorithm to analyze the domain name and text based network address.

27. The apparatus as recited in claim 26, wherein the deductive algorithm comprises one of an expert system or rule based system.

28. A computer readable storage medium having instructions stored thereon for determining a geographic location for a network address, the instructions when executed on a machine, cause the machine to:

receive a trace route comprising first and second network host identifiers for hosts disposed between a server and a client on a network;

match the first network host identifier to a first template;

first parse the first network host identifier according to the first template to determine a first geographically significant component; wherein the geographically significant component is derived from a construction format of the network host identifier, where the construction format comprises a first portion including port and device data for network equipment utilized to host a particular network host, a last portion identifying a particular backbone provider, and a middle portion comprising a reference to a nearest airport to a device to which the particular network host is assigned;

identify an estimated geographic location for the client based at least in part on said first parsing;

match the second network host identifier to a second template;

second parse the second network host identifier according to the second template to determine a second geographically significant component; and revise said estimated geographic location based at least in part on said second parsing.

29. The storage medium of claim 28, said instructions including further instructions capable of directing the processor to perform:

revising said estimated geographic location based at least in part on a client profile associated with the client.

30. The storage medium of claim 29, said instructions including further instructions capable of directing the processor to perform:
said client contacting the server with the web browser, said browser providing the client profile to the server.

31. The storage medium of claim 29, wherein the client profile is based at least in part on a customer database identifying the client.

32. The storage medium of claim 29, wherein the client profile is based at least in part on a mass-marketing database identifying the client.

33. The apparatus of claim 28, wherein determining a geographically significant component of the domain name and network address comprises:
determination component for performing one of lexical analysis or pattern matching on the domain name and the text based network address to match against known formats; and
selection component for selecting a likely geographically significant component using a deductive algorithm to analyze the domain name and text based network address returned from the parsing.

34. The apparatus as recited in claim 33, wherein the deductive algorithm comprises one of an expert system or rule based system.

35. A computer readable storage medium having instructions stored thereon for determining a geographic location, the instructions when executed on a processor, cause the processor to:
creating a log comprising network addresses of clients that have communicated with a web server;
filtering the log so as to remove undesirable network addresses;
asynchronously performing a trace route between a first one of said filtered network addresses and the server regardless of a whether a previous geographic location for the first one of said filtered network addresses had been determined;
analyzing a result of said asynchronous performed trace route to ascertain a geographically significant component of at least one network address between a first one of said filtered network addresses and the server; wherein the geographically significant component is derived from a construction format of the network address, where the construction format comprises a first portion including port and device data for network equipment utilized to host a particular network address, a last portion identifying a particular backbone provider, and a middle portion comprising a reference to a nearest airport to a device to which the particular network address is assigned; and
determining a geographic location for said first one responsive to said analyzing.

36. The storage medium of claim 35, said instructions including further instructions capable of directing the processor to perform:
generating a report comprising geographic locations for clients that have communicated with the web server.

37. The storage medium of claim 35, wherein said instructions for determining the geographic location comprises instructions for:
matching the result against a template identifying geographically significant portions of network addresses formatted in compliance with the template.

38. An apparatus for geographic location determination based at least in part on inspection of a network address of a client, the apparatus comprising:
a network comprising a plurality of devices, the devices including a plurality of client nodes;
a server communicatively coupled to the network;
performing means coupled to at least one of the server and client for performing a trace route between the server and the address of a client being one of the plurality of client nodes, the trace route identifying at least one domain name in a route between the server and the client;
identifying means coupled to the server for identifying a construction format for the domain name;
identifying means coupled to the server for identifying a geographically significant component of the domain name;
determining means coupled to the server for determining a geographic location for the domain name based at least in part on the geographically significant component; wherein the geographically significant component is derived from a construction format of the domain name, where the construction format comprises a first portion including port and device data for network equipment utilized to host a particular network address, a last portion identifying a particular backbone provider, and a middle portion comprising a reference to a nearest airport to a device to which the particular network address is assigned;
determining means coupled to the server for determining a possible geographic location of the client based on a geographically significant component of a text based network address corresponding to the client network address; and
validating means coupled to the server for validating the possible geographic location of the client using the determined geographical location of the domain name identified in the trace route, the validating means to return a validated geographic location of the client and store the validated geographical location of the domain name in a database residing on a storage device coupled to the server.

39. The apparatus of claim 38, further comprising:
analyzing means coupled to the server for analyzing domain names associated with a network access provider so as to identify the construction formats for said domain names;
identifying means coupled to the server for identifying geographically significant components of said construction components; and
storing means coupled to the server for storing cross-references between said geographically significant components and geographic locations in a storage.

40. The apparatus of claim 39, wherein the validating means further comprises:
determining means to perform a first geographic determination for the network address based on a determined geographical location for the domain name returned in the trace route;
the determining means to perform at least one alternate geographic determination for the network address based on at least one alternate determined geographic location for at least one additional domain name returned from the trace route; and
selection means to return a validated geographic location of the client selected from either the first geographic location determination or one of the at least one alternate determined geographic location determinations.

41. An apparatus for determining a geographic location for a network address, comprising:
a network comprising a plurality of devices, the devices including a plurality of client nodes;
a server communicatively coupled to the network;
receiving means for receiving a trace route comprising first and second network host identifiers for hosts disposed between the server and a client being one of the plurality of client nodes on a network;
matching means for matching the first network host identifier to a first template;
parsing means for first parsing the first network host identifier according to the first template to determine a first geographically significant component of the first network host identifier; wherein the geographically significant component is derived from a construction format of the network host identifier, where the construction format comprises a first portion including port and device data for network equipment utilized to host a particular network host, a last portion identifying a particular backbone provider, and a middle portion comprising a reference to a nearest airport to a device to which the particular network host is assigned;
identifying means for identifying an estimated geographic location for the client based at least in part on said first parsing;
the matching means for matching the second network host identifier to a second template;
the parsing means for second parsing the second network host identifier according to the second template to determine a second geographically significant component of the second host identifier;
revision means for revising said estimated geographic location based at least in part on said second parsing; and
storing means for storing said estimated geographical location in a storage coupled to the server.

42. The apparatus of claim 41, further comprising:
revising means for revising said estimated geographic location based at least in part on a client profile associated with the client.

43. An apparatus for determining a geographic location, comprising:
a network comprising a plurality of devices, the devices including a plurality of client nodes;
a web server communicatively coupled to the network;
creating means for creating a log comprising network addresses of one or more clients of the plurality of client nodes that have communicated with the web server;
filtering means for filtering the log so as to remove undesirable network addresses;
asynchronous tracing means for asynchronously performing a trace route between a first one of said filtered network addresses and the server regardless of a whether a previous geographic location for the first one of said filtered network addresses had been determined;
analyzing means for analyzing a result of said asynchronous performed trace route and for ascertaining a geographically significant component of at least one network address between a first one of said filtered network addresses and the server; wherein the geographically significant component is derived from a construction format of the network address, where the construction format comprises a first portion including port and device data for network equipment utilized to host a particular network address, a last portion identifying a particular backbone provider, and a middle portion comprising a reference to a nearest airport to a device to which the particular network address is assigned;
determining means for determining a geographic location for said first one responsive to said analyzing; and
storing means for storing the geographical location in a storage coupled to the web server.

44. The apparatus of claim 43, further comprising:
generating means for generating a report comprising geographic locations for clients that have communicated with the web server.

45. The apparatus of claim 43, wherein said determining means for determining the geographic location comprises:
matching means for matching the result against a template identifying geographically significant portions of network addresses formatted in compliance with the template.

* * * * *